United States Patent
Summers

[19]

[11] Patent Number: 6,031,688
[45] Date of Patent: *Feb. 29, 2000

[54] SUSPENSION MOUNTING PLATE WITH CANTILEVERED LOAD BEAM SUPPORT

[75] Inventor: Robert N. Summers, La Habra, Calif.

[73] Assignee: Magnecomp Corp., Temecula, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/535,717

[22] Filed: Sep. 19, 1995

[51] Int. Cl.[7] ....................................................... G11B 5/48
[52] U.S. Cl. ............................................................ 360/104
[58] Field of Search .............................. 360/81, 101, 103, 360/104, 105, 106, 107

[56] References Cited

U.S. PATENT DOCUMENTS

| | | | |
|---|---|---|---|
| 4,947,275 | 8/1990 | Hinlein | 360/104 |
| 5,006,946 | 4/1991 | Matsuzaki | 360/104 |
| 5,099,373 | 3/1992 | Shibata et al. | 360/104 |
| 5,172,286 | 12/1992 | Jurgenson | 360/104 |
| 5,208,712 | 4/1993 | Hatch et al. | 360/105 |
| 5,262,911 | 11/1993 | Cain et al. | 360/104 |
| 5,282,103 | 1/1994 | Hatch et al. | 360/104 |
| 5,381,289 | 1/1995 | Fiedler | 360/104 |
| 5,446,611 | 8/1995 | Webber | 360/104 |
| 5,508,860 | 4/1996 | Takagi et al. | 360/97.01 |

FOREIGN PATENT DOCUMENTS 5-6638  1/1993  Japan ..................................... 360/104

*Primary Examiner*—David Davis
*Attorney, Agent, or Firm*—Louis J. Bachand

[57] ABSTRACT

Disk drive suspension including an actuator, a modified base mounting plate fixed to the actuator to support a load beam, flexure and slider assembly cantilevered from the actuator in operative association with a disk. The modified base mounting plate further individually mounts each load beam on an actuator for separate demounting of one without demounting of the other.

5 Claims, 4 Drawing Sheets

SUSPENSION MOUNTING PLATE WITH CANTILEVERED LOAD BEAM SUPPORT

TECHNICAL FIELD

This application relates to computer hard disk drives and, more particularly, to load beam assemblies for such drives. The invention further relates to improvements in the base or mounting plate portion of load beam assemblies, i.e. improvements in the mounting plates which define the base. The invention modifies such base mounting plates to enable the use of substitute load beams, including shorter and more rigid load beams in existing suspensions designed for other, longer load beams, with a gain in performance and a saving in design and manufacturing cost. These modified bases may be used in newly designed suspensions also.

The modified mounting plate bases further enable the individuated mounting of multiple load beams onto single actuators using ordinary mounting techniques, such as swaging, but with the new result of ready demountability of one load beam without disruption of the mounting of the other. This feature of the invention allows the replacement of just one of a pair of load beams on a common actuator, where only one is defective, for substantial savings in manufacturing time, yields and costs.

BACKGROUND OF THE INVENTION

Computer hard drives include disks and sliders, the sliders being supported on suspensions to fly closely above the disk surface in precisely positioned read/write relation. The positioning of the slider, assuming a constant actuator, is determined by the load beam assembly, this assembly comprising the load beam, the flexure and the slider, and the mounting base which mounts the other load beam components to the actuator. Modification of the mounting plate in accordance with the teaching of this invention enables the separate mounting of load beams to a common actuator and the cantilever suspension of a load beam from a mounting plate extending beyond the actuator. In the latter case, a relatively shorter and stiffer load beam can be combined with a cantilevered mounting plate as a base, and substitute for a longer, more flexible load beam previously used in a given suspension. This gives a gain in performance while maintaining the precise positioning of the slider despite the use of a shorter load beam. The shorter load beam would not ordinarily extend sufficiently to permit the required positioning when substituted for the standard longer load beam.

SUMMARY OF THE INVENTION

It is accordingly an object of the invention to provide the means to mount a load beam assembly to an actuator for individual dismounting, whether or not cantilevered, and in certain cases to be supported from beyond the actuator so as to have a relatively shorter load beam suffice for a longer with increase in stiffness and no modification of the overall suspension beyond changes in the load beam and its mounting. It is another object to provide simple mechanical modification of the base mounting plate to enable individual demounting and make up for the change in load beam dimensions. It is another object to provide a suspension design modified solely at the mounting plate-load beam interconnection so that the suspension maintains its original positioning characteristic. A still further object is to provide novel mounting plates for load beams.

These and other objects of the invention to become apparent hereinafter are realized in a disk drive suspension mounting plate for mounting a load beam to an actuator in operative association with a disk, the actuator defining a mounting hole, the mounting plate defining a first mounting means registerable with the actuator mounting hole and cooperating therewith to mount the mounting plate to the actuator, the mounting means plate defining second mounting means cooperating with the load beam to mount the load beam on the mounting plate as the sole support of the load beam in its said operative association. The actuator can further define a second mounting hole longitudinally spaced from the first mounting hole, the mounting plate mounting means being a first mounting means and comprising an aperture having a wall deflectable into engagement selectively with the first or second actuator mounting hole to mount the mounting plate to the actuator for sole supporting of the load beam correspondingly from the actuator first or second mounting hole. Additionally, the mounting plate can have a portion cantilevered from the actuator, the load beam being supported from that portion.

Accordingly, in one aspect, the invention provides a disk drive suspension comprising an actuator having first and second load beams mounted thereto for operative association with a disk, the actuator defining first and second load beam mounting holes extending vertically in a common plane and spaced along the longitudinal axis of the actuator, the first load beam being mounted to the actuator at the first mounting hole, the second load beam being mounted to the actuator at the second mounting hole, the first and second load beams lying in the common vertical plane, whereby the first and second load beams are individually separable from the actuator for demounting of one load beam without disturbing the mounting of the other.

In this and like embodiments, there is also included a first load beam mounting plate mounting the first load beam to the actuator at the first mounting hole, a second load beam mounting plate mounting the second load beam to the actuator at the second mounting hole, and the first and second load beam mounting plates lie substantially parallel to each other in the common vertical plane. Typically, the actuator has an end bracketed by the first and second load beams, first and second load beam mounting plates being of different lengths to extend respectively to the first and second mounting holes from the actuator end, the second load beam mounting plate is apertured opposite the first load beam mounting hole and is free of mounting the second load beam at the first mounting hole, and the first and second mounting plates are swaged into engagement with the first and second mounting holes respectively.

In a further embodiment, the invention provides in combination the foregoing actuator and a flexure and slider mounted on each of the load beams in operative association with a disk.

In a still further embodiment, the invention provides the method of carrying first and second load beams on a common actuator in operative association with the disk of a disk drive suspension, including providing separate mounting holes spaced along the longitudinal axis of the actuator, and individually mounting the load beams with separate mounting plates to the actuator at the separate mounting holes for separately demounting one of the load beams without disturbing the other of the load beams.

In another embodiment, the invention provides a disk drive suspension actuator defining a first mounting hole, a mounting plate mounted in the mounting hole and having a portion thereof cantilevered from the actuator, the mounting plate defining in its cantilevered portion an aperture longitudinally spaced from the mounting hole, and a load beam mounted in the cantilevered portion aperture for operative association with a disk at a distance from the actuator greater than the length of the load beam.

In this and like embodiments, typically, each of the actuator and the load beam partially overlap the mounting plate, the mounting plate defines a longitudinal extension of the actuator enabling a relatively too short load beam to be mounted in operative association with the disk in substitution for a relatively longer load beam without otherwise altering the components of the disk drive suspension, the load beam mounted on the mounting plate is torsionally stiffer than a load beam of the same overall length of the mounting plate and the load beam, the mounting plate and the load beam are each swaged into engagement with their mounting holes and aperture respectively, and there is further included a flexure and slider mounted on the load beam in operative association with a disk.

More particularly, the invention comprises in this embodiment a disk drive suspension comprising an actuator defining a mounting hole, a mounting plate mounted in the mounting hole and having a cantilevered portion extending from the actuator, the mounting plate defining an aperture and a load beam, flexure and slider assembly, the assembly load beam being mounted in the aperture for operative association of the slider with a disk at a distance from the actuator greater than the length of the load beam.

In addition, the invention provides a disk drive suspension comprising an assembly of an actuator, a load beam, a flexure and a slider, the slider being adapted to be supported in operative position opposite a disk, the load beam being of insufficient length to support the slider in operative position when mounted on the actuator, and a mounting plate carried by the actuator and carrying the load beam, the mounting plate and load beam together having sufficient length to support the slider in its operative position.

The invention further contemplates provision of the method of supporting on an actuator a load beam flexure and slider assembly in operative association with a disk where the load beam is insufficiently long, including mounting a mounting plate to an actuator in cantilevered relation, and mounting the load beam, flexure and slider assembly to the mounting plate at its cantilevered portion.

BRIEF DESCRIPTION OF THE DRAWINGS

The invention will be further described in conjunction with the attached drawings in which.

DESCRIPTION OF THE PREFERRED EMBODIMENTS

The present suspension utilizes a novel mounting plate or base for a load beam enabling on the one hand the cantilever mounting of a shorter, more torsionally stiff load beam in a suspension designed for a longer load beam, and on the other hand enabling separately demountable mountings of upper and lower load beams on a common actuator. The invention mounting plate or load beam assembly base in each embodiment is a rigid element having a mounting hole to which the load beam is affixed, as by swaging the periphery of a preformed hole in the load beam into engagement with the mounting hole. The mounting plate is itself mounted to the actuator by swaging a boss formed on the mounting plate into a receiving opening in the actuator.

Figure 1:
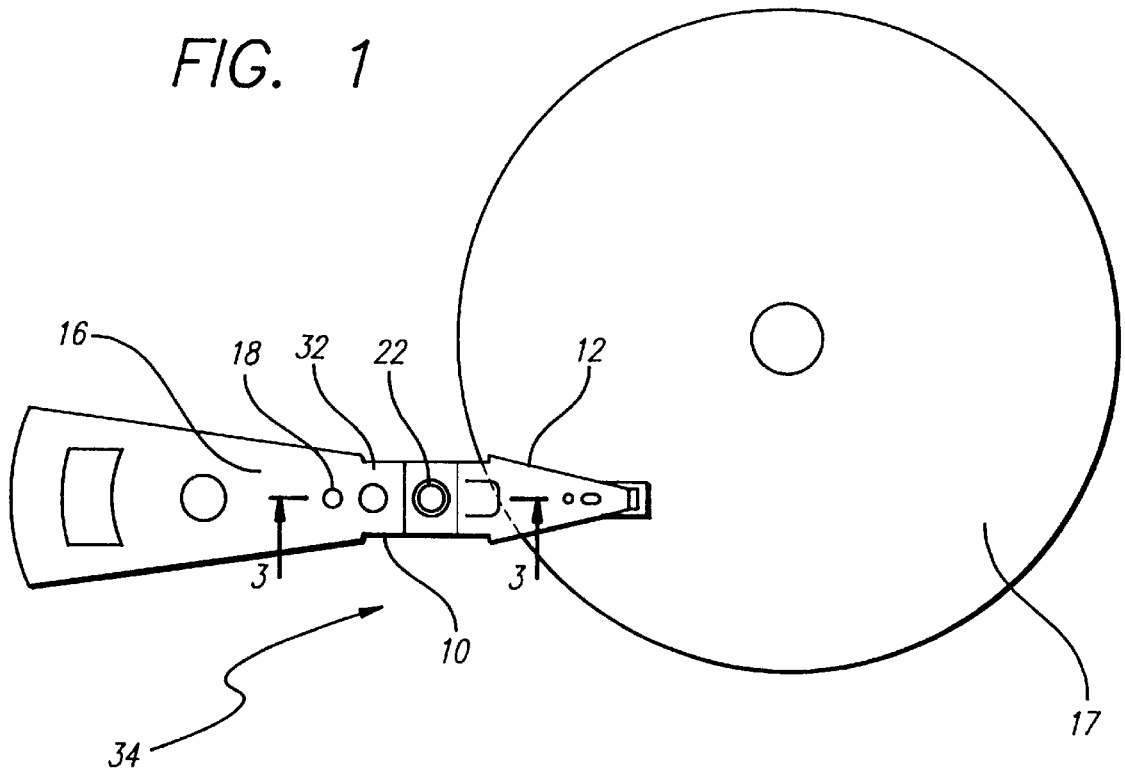
FIG. 1 is a plan view of one embodiment of the invention mounting plate and disk drive suspension.
Figure 2:
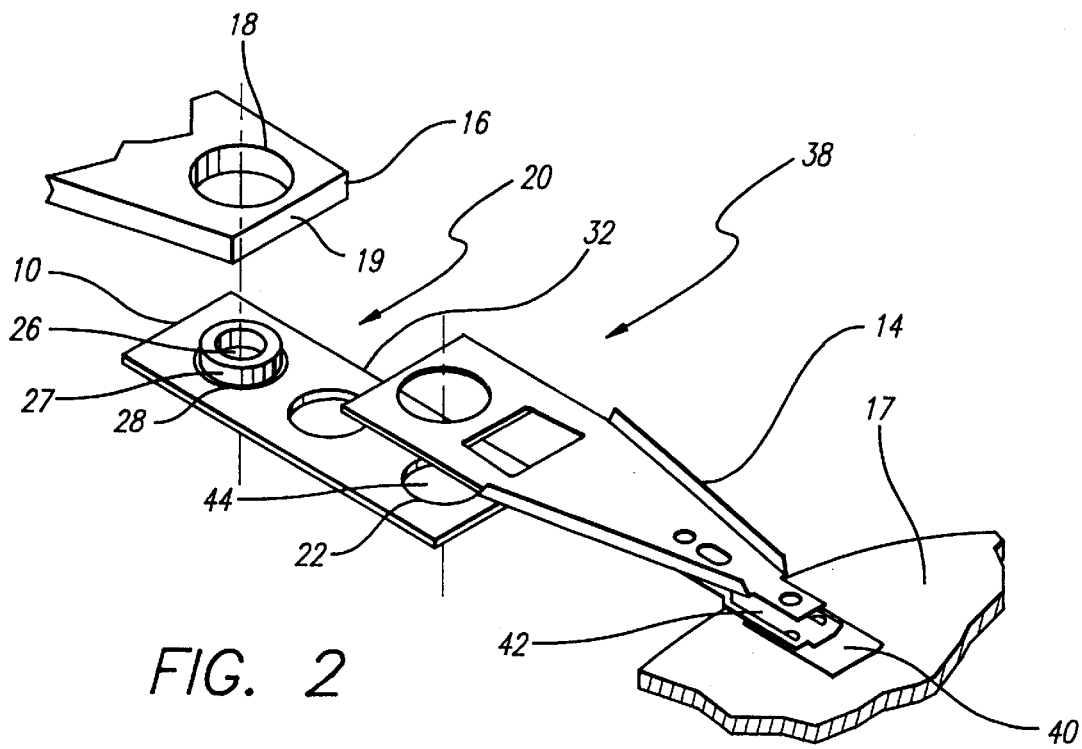
FIG. 2 is an exploded view thereof.
Figure 3:
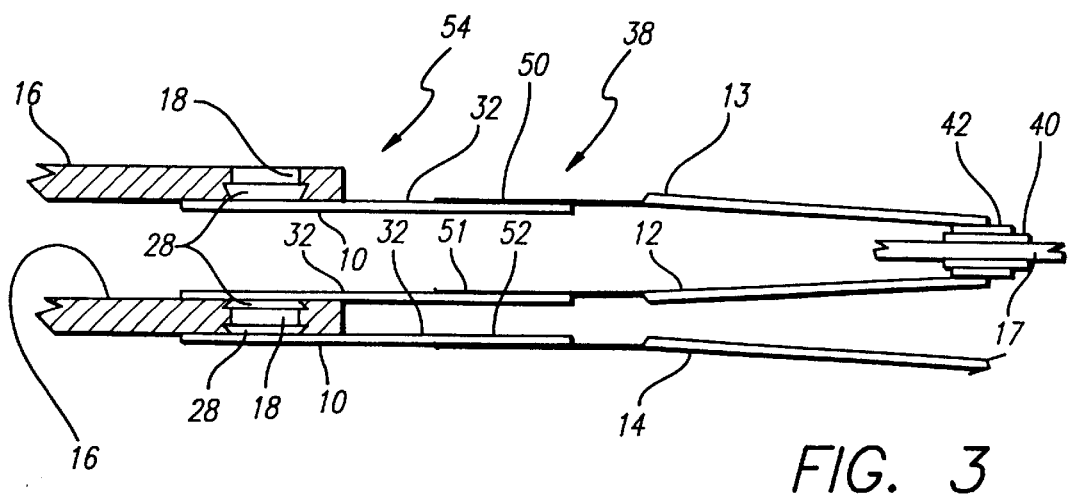
FIG. 3 is a view taken on line 3—3 in FIG. 1.

With reference now to the drawings in detail, in FIGS. 1–3, disk drive suspension mounting plate 10 mounts upper and/or lower (first or second) load beams 12, 13, 14 to an actuator 16 in operative association with a disk 17. The actuator 16 defines a mounting hole 18 inward of actuator end 19. Mounting plate 10 defines a first mounting means 20 registerable with the actuator mounting hole 18 and cooperable therewith to mount the mounting plate to the actuator, as shown particularly in FIG. 3. The mounting plate 10 further defines a second mounting means 22 cooperable with the load beam 12, 14 to mount the load beam on the mounting plate as the sole support of the load beam in its operative association with the disk 17. The mounting plate first mounting means 20 comprises an aperture 26. Aperture 26 has a wall 27 formed by boss 28 deflectable into engagement with the actuator mounting hole 18 to mount the mounting plate 10 to the actuator 16 for sole supporting of the load beams 12, 13, 14 correspondingly from the actuator mounting hole. Additionally, the mounting plate 10 has a portion 32 cantilevered from the actuator 16, the load beam 12, 13, 14 being supported from that portion for purposes to appear.

With further reference to FIGS. 1–3, an embodiment is shown wherein the load beams 12, 13, 14 are relatively shorter than original design load beams. This may occur as a result of a load beam redesign within a given disk drive suspension to make use of a shorter load beam, and there is a continuing necessity or desirability to cantilever the load beam from the actuator. In this embodiment, mounting plate 10 is part of each of the overall disk drive suspensions 34 which further include actuator 16, a load beam assembly 38 comprising a slider 40, flexure 42 and a load beam, e.g. load beam 12, 13 or 14. Each load beam assembly 38 is mounted by its respective mounting plates 10 to the actuator 16 by swaging mounting plate boss 28 into actuator mounting hole 18, thereby arranging the assembly in operative association with the disk 17. Typically, only one mounting hole 18 is used for the upper and lower load beams 12, 13, 14.

Accordingly, in the illustrated embodiment of FIGS. 1–3, actuator 16 mounts mounting plate 10 in mounting hole 18. As shown, the mounting plate 10 has itself a cantilevered portion 32 projecting from the actuator 16. Mounting plate portion 32 has formed within it an aperture 44 longitudinally spaced from the mounting hole 18 and defining second mounting means 22 (FIG. 2). Load beams 12, 13 and 14 are mounted in the cantilevered portion aperture 44 for operative association with disk 17. The load beams 12, 13 and 14 are each of a given length which is less than the length they need to be should they have to be mounted to the actuator 16 directly. As shown, however, because of the interposition of the mounting plate 10, the load beams 12, 13 and 14 are positioned at a distance from the actuator 16 greater than the length of the load beam.

Other features of the present embodiment include the actuator 16 and the load beams 12, 13, 14 partially overlapping the mounting plate at 50, 51 and 52 respectively, and the mounting plate 10 defining a longitudinal extension 54 of the actuator enabling a relatively too short load beam 12, 13, and 14 to be mounted in operative association with the disk 17 in substitution for a relatively longer load beam without otherwise altering the components of the disk drive suspension. The shorter load beam 12, 13 and 14, per se, and when mounted on the mounting plate 10 are each torsionally stiffer than a bodily unitary load beam of the same overall length of the mounting plate and the load beam, for higher performance in use.

In the method aspects of this embodiment of the invention, actuator 16 supports a load beam, flexure and slider assembly 38 in operative association with a disk 17 where the load beam 12, 13 or 14 is insufficiently long, by mounting mounting plate 10 to the actuator in cantilevered relation, and mounting the load beam, flexure and slider assembly 38 to the mounting plate at its cantilevered portion 32.

Figure 4:
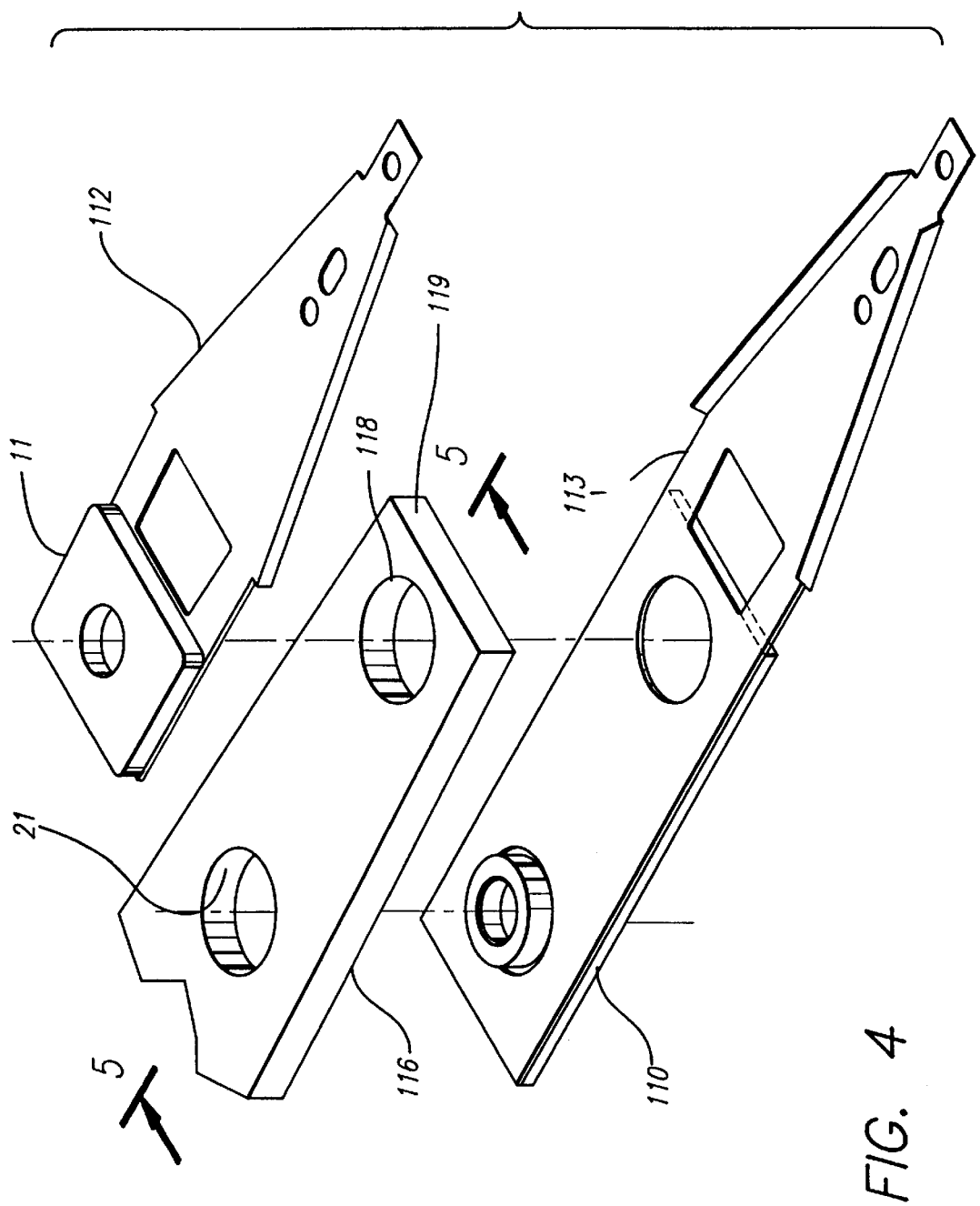
FIG. 4 is a view like FIG. 2 of another embodiment of the invention.
Figure 5:
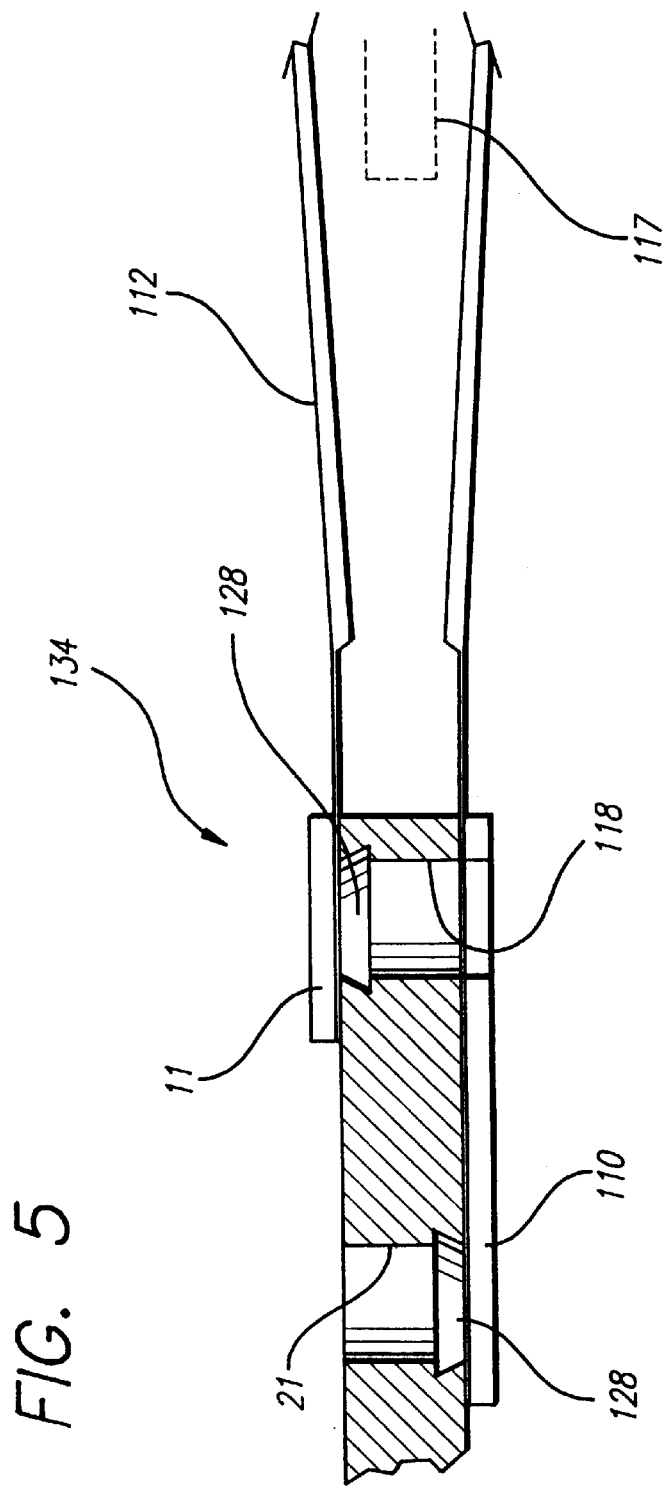
FIG. 5 is a view in vertical section of the invention embodiment of FIG. 4.

In a second embodiment of the invention, with reference to FIGS. 4 and 5, wherein like parts bear like numerals plus 100, mounting plates 11, 110 are secured to actuator 116, this time in a manner such that each load beam 112, 113, is separately mounted to the actuator. Accordingly, actuator 116 has upper and lower first and second load beams 112, 113 mounted thereto for operative association with disk 117. Actuator 116 has a length appropriate to its purpose in fixing load beam 112, 113 to the closer or the farther mounting opening 118, 21, respectively. The first and second load beam mounting holes 118 and 21 extend vertically and in a common plane and are spaced along the longitudinal axis of the actuator 116 at least a distance sufficient to permit separate insertion of the appropriate mounting plate boss 128 into the appropriate mounting hole . The first load beam 112 is mounted to the actuator 116 at the first mounting hole 118, the second load beam 113 is mounted to the actuator at the second mounting hole 21, as by swaging or otherwise securing the parts together. Separate swaging operations are carried out at each mounting point and the mounting of one load beam does not depend on simultaneous or sequential mounting of the other load beam. The first and second load beams 112, 113 lie in the common vertical plane also. Being separately mounted, the first and second load beams 112, 113 are individually separable from the actuator for demounting of one load beam without disturbing the mounting of the other. One or the other mounting plate 11, 110 is simply separated and the defective load beam released. A new load beam can be positioned and fastened without use of the mounting hole of the good load beam. In the past, where two load beams were mounted in a single hole, of FIG. 3, removal of the one necessitated removal of the other or at least precluded mounting of a replacement load beam by ordinary means since the remaining load beam was in place. Therefore, if one load beam tested defective both it and its mate across the mounting hole had to be changed out, even where the second load beam was not defective. This practice increases expense in manufacture and lowers yield of good product, and the present invention obviates the problem.

It will be noted that in the illustrated form of this embodiment the first and second load beam mounting plates 11, 110 lie substantially parallel to each other in the common vertical plane in which the mounting holes 118, 21 lie. Also, actuator 116 end 119 is bracketed by the load beams 112, 113. The first and second load beam mounting plates 11, 110 are of different lengths to extend respectively to the first and second mounting holes 118, 21 from the actuator end 1 19. The second load beam mounting plate 110 is apertured opposite the first load beam mounting hole 118 but does not mount anything there, that is the plate 110 is free of mounting anything where apertured opposite mounting hole 118. Finally, the first and second load beam mounting plates 11, 110 are swaged into engagement with the first and second mounting holes 118, 21 respectively.

As in the previous embodiment, the load beam assembly 134 may be combined in operative association with disk 117. There is further provided the method of carrying first and second load beams 112, 113 on a common actuator 116 in operative association with a disk of a disk drive suspension, including providing separate mounting holes 118, 21 spaced along the longitudinal axis of the actuator 116, and individually mounting the load beams to the actuator with separate mounting plates 11, 110 at the separate mounting holes for separately demounting one of the load beams without disturbing the other of the load beams.

The specific design of the load beams, flexures, sliders and actuators is not narrowly critical as the present invention is applicable to many styles of load beams, flexures, sliders, and actuators in disk drive suspensions where there is need to have the load beams separately demountable or to substitute a shorter for a longer load beam without revising the remainder of the suspension.

The invention thus provides a novel base mounting plate for disk drive suspensions, and further provides a means to mount a load beam assembly to an actuator for individual dismounting, whether or not cantilevered, and in certain cases to be supported from beyond the actuator so as to have a relatively shorter load beam suffice for a longer one with increase in stiffness and no modification of the overall suspension beyond changes in the load beam and its mounting. The invention requires only simple mechanical modification of the base mounting plate to enable individual demounting and make up for the change in load beam dimensions. Modifications of the suspension design are made solely at the mounting plate-load beam interconnection so that the suspension maintains its original positioning characteristic, but with improved stiffness where the mounting plate cantilevers the load beam beyond the actuator end.

The foregoing objects of the invention are thus met.

I claim:

1. A disk drive suspension comprising an actuator having first and second load beams mounted thereto for operative association with a disk, and first and second mounting plates of shorter and longer lengths respectively, said actuator defining first and second mounting holes extending vertically in a common plane, said mounting holes being longitudinally spaced such that said first, shorter length mounting plate only reaches said first mounting hole, said first load beam being mounted to said actuator at said first mounting hole by said first mounting plate, said second load beam being mounted to said actuator at said second mounting hole by said second mounting plate, said first and second load beams lying in said common vertical plane, said first and second load beams being longitudinally offset in their respective mountings, whereby said first and second load beams are individually separable from said actuator or demounting Of one load beam from said actuator without disturbing the mounting of the other.

2. Disk drive suspension according to claim 1, in which said actuator has an end, said first and second load beam mounting plates in registration with said actuator end extending respectively to said first and second mounting holes from said actuator end.

3. Disk drive suspension according to claim 2, in which said second load beam mounting plate is apertured opposite said actuator first load beam mounting hole and is free of mounting said second load beam at said first mounting hole.

4. Disk drive suspension actuator according to claim 3, in which said first and second mounting plates are swaged into engagement with said first and second mounting holes respectively.

5. Disk drive suspension according to claim 1, said suspension further including a flexure and slider mounted on each of said first and second load beams in operative association with a disk.

* * * * *

UNITED STATES PATENT AND TRADEMARK OFFICE
CERTIFICATE OF CORRECTION

PATENT NO. : 6,031,688
DATED : February 29, 2000
INVENTOR(S) : Summers

It is certified that error appears in the above-indentified patent and that said Letters Patent is hereby corrected as shown below:

Column 7, line 19, "or" should read --for--; and

Column 7, line 20, "Of" should read --of--.

Signed and Sealed this

Third Day of April, 2001

*Attest:*

NICHOLAS P. GODICI

*Attesting Officer*     *Acting Director of the United States Patent and Trademark Office*